United States Patent
Jo et al.

(10) Patent No.: US 11,101,462 B2
(45) Date of Patent: Aug. 24, 2021

(54) POSITIVE ELECTRODE ACTIVE MATERIAL FOR SECONDARY BATTERY, POSITIVE ELECTRODE FOR SECONDARY BATTERY AND SECONDARY BATTERY COMPRISING THE SAME

(71) Applicant: LG Chem, Ltd., Seoul (KR)

(72) Inventors: Chi Ho Jo, Daejeon (KR); Sin Young Park, Daejeon (KR); Wang Mo Jung, Daejeon (KR); Byung Chun Park, Daejeon (KR); So Ra Baek, Daejeon (KR)

(73) Assignee: LG Chem, Ltd.

( * ) Notice: Subject to any disclaimer, the term of this patent is extended or adjusted under 35 U.S.C. 154(b) by 32 days.

(21) Appl. No.: 15/754,111

(22) PCT Filed: Nov. 25, 2016

(86) PCT No.: PCT/KR2016/013708
§ 371 (c)(1),
(2) Date: Feb. 21, 2018

(87) PCT Pub. No.: WO2017/095081
PCT Pub. Date: Jun. 8, 2017

(65) Prior Publication Data
US 2018/0241036 A1 Aug. 23, 2018

(30) Foreign Application Priority Data

Nov. 30, 2015 (KR) .................. 10-2015-0168682
Nov. 24, 2016 (KR) .................. 10-2016-0157559

(51) Int. Cl.
| | |
|---|---|
| H01M 4/525 | (2010.01) |
| H01M 4/131 | (2010.01) |
| C01G 53/00 | (2006.01) |
| H01M 4/36 | (2006.01) |
| H01M 4/02 | (2006.01) |
| H01M 10/0525 | (2010.01) |
| H01M 10/052 | (2010.01) |

(52) U.S. Cl.
CPC ............ *H01M 4/525* (2013.01); *C01G 53/50* (2013.01); *H01M 4/131* (2013.01); *H01M 4/362* (2013.01); *C01P 2002/54* (2013.01); *C01P 2004/61* (2013.01); *C01P 2004/82* (2013.01); *C01P 2006/11* (2013.01); *H01M 10/052* (2013.01); *H01M 10/0525* (2013.01); *H01M 2004/021* (2013.01); *H01M 2004/028* (2013.01)

(58) Field of Classification Search
CPC ...... H01M 4/525; H01M 4/131; H01M 4/362; H01M 4/364; H01M 4/366; H01M 4/505; H01M 2004/021; H01M 2004/028; H01M 10/052; H01M 10/0525; C01G 53/50
See application file for complete search history.

(56) References Cited

U.S. PATENT DOCUMENTS

| | | |
|---|---|---|
| 2005/0271944 A1 | 12/2005 | Suhara et al. |
| 2006/0257745 A1 | 11/2006 | Choi et al. |
| 2007/0099087 A1 | 5/2007 | Mihara et al. |
| 2007/0248883 A1 | 10/2007 | Oda et al. |
| 2009/0068561 A1 | 3/2009 | Sun et al. |
| 2013/0228718 A1 | 9/2013 | Lee et al. |
| 2013/0330612 A1 | 12/2013 | Choi et al. |
| 2014/0038052 A1 | 2/2014 | Song et al. |
| 2015/0180025 A1 | 6/2015 | Mitsumoto et al. |
| 2015/0340686 A1 | 11/2015 | Sun et al. |

FOREIGN PATENT DOCUMENTS

| | | | |
|---|---|---|---|
| CN | 1706058 A | 12/2005 | |
| CN | 103443974 A | 12/2013 | |
| CN | 103460457 A | 12/2013 | |
| CN | 105009333 A | 10/2015 | |
| EP | 2940761 A1 * | 11/2015 | ............ H01M 4/364 |
| JP | 2007257985 A | 10/2007 | |
| JP | 2009525578 A | 7/2009 | |
| JP | 2013065468 A | 4/2013 | |
| JP | 2014191925 A | 10/2014 | |
| KR | 20050083869 A | 8/2005 | |
| KR | 20070027591 A | 3/2007 | |

(Continued)

OTHER PUBLICATIONS

ESpaceNet Machine Translation of JP2013065468A Osada et al. (Year: 2013).*
Search report from International Application No. PCT/KR2016/013708, dated Mar. 2, 2017.
Chinese Search Report for Application No. 201680052108.2, dated Jun. 10, 2020, pp. 1-3.

*Primary Examiner* — Cynthia H Kelly
*Assistant Examiner* — Kirsten B Tysl
(74) *Attorney, Agent, or Firm* — Lerner, David, Littenberg, Krumholz & Mentlik, LLP

(57) ABSTRACT

The present invention provides a positive electrode active material for a secondary battery, a positive electrode for a secondary battery, and a secondary battery including the same, the positive electrode active material including a first lithium-nickel oxide particle having an average particle size ($D_{50}$) of more than 8 μm to 20 μm or less, and a second lithium-nickel oxide particle having an average particle size ($D_{50}$) of 8 μm or less, wherein the first lithium-nickel oxide particle has a particle strength of 100 MPa to 250 MPa, the second lithium-nickel oxide particle has a particle strength of 50 MPa to 100 MPa, a ratio r of the strength of the first lithium-nickel oxide particle to the strength of the second lithium-nickel oxide particle satisfies Equation 1 set forth herein.

9 Claims, No Drawings

(56) References Cited

FOREIGN PATENT DOCUMENTS

| | | |
|---|---|---|
| KR | 100975875 B1 | 8/2010 |
| KR | 20140018628 A | 2/2014 |
| KR | 20150016129 A | 2/2015 |
| WO | 2005020354 A1 | 3/2005 |
| WO | 2005124898 A1 | 12/2005 |
| WO | 2014010730 A1 | 1/2014 |
| WO | 2017057078 A1 | 4/2017 |

* cited by examiner

POSITIVE ELECTRODE ACTIVE MATERIAL FOR SECONDARY BATTERY, POSITIVE ELECTRODE FOR SECONDARY BATTERY AND SECONDARY BATTERY COMPRISING THE SAME

CROSS-REFERENCE TO RELATED APPLICATION

The present application is a national phase entry under 35 U.S.C. § 371 of International Application No. PCT/KR2016/013708 filed Nov. 25, 2016, the disclosure of which is incorporated herein in its entirety by reference, which claims priority to Korean Patent Application No. 10-2015-0168682, filed on Nov. 30, 2015 and Korean Patent Application No. 10-2016-0157559, filed on Nov. 24, 2016, in the Korean Intellectual Property Office, the disclosures of which are incorporated herein in their entirety by reference.

TECHNICAL FIELD

The present invention relates to a positive electrode active material for a secondary battery that exhibits a high electrode density and is capable of improving an output characteristic of a battery, and a positive electrode for a secondary battery and a secondary battery including the same.

BACKGROUND ART

As technology development and demand for mobile devices increase, demand for secondary batteries as energy sources is sharply increasing. Among the secondary batteries, a lithium secondary battery that has high energy density and voltage, a long cycle lifespan, and a low self-discharge rate is commercialized and being widely used. However, the lithium secondary battery has a problem in that its life sharply decreases as charge and discharge are repeated. Particularly, such a problem is more serious at high temperature. This is a phenomenon that occurs due to decomposition of an electrolyte, deterioration of an active material, and an increase in an internal resistance of a battery due to moisture in the battery or other reasons.

Accordingly, a positive electrode active material for a lithium secondary battery that is currently being vigorously researched, developed, and used is $LiCoO_2$ having a layered structure. Although $LiCoO_2$ is used the most due to its excellent lifespan characteristics and charge/discharge efficiency, there is a limitation for $LiCoO_2$ to be applied to a technology for increasing battery capacity due to its low structural stability.

As a positive electrode active material for substituting for $LiCoO_2$, various lithium transition metal oxides such as $LiMnO_2$ and $Li_2MnO_3$ having a layered crystal structure and $LiMn_2O_4$, $LiNiO_2$, $LiFePO_4$, or $Li(Ni_xCo_yMn_z)O_2$ having a spinel crystal structure have been developed.

Among these, lithium-manganese-based oxides such as $LiMnO_2$, $Li_2MnO_3$, and $LiMn_2O_4$ have advantages including excellent thermal stability and low cost but has problems including low capacity and low high-temperature characteristics.

Accordingly, research on lithium-nickel-based positive electrode active materials that exhibit a discharge capacity that is higher than lithium-cobalt-based positive electrode active materials by 20% or more is being vigorously carried out. $LiNiO_2$ forms a layered structure as $LiCoO_2$ and has an initial discharge capacity of 180 m Ah/g to 200 mAh/g. However, because the structure of $LiNiO_2$ changes from a monoclinic structure to a hexagonal structure during charging and discharging and becomes unstable, the capacity sharply decreases as charge and discharge continuously occur. In addition, $LiNiO_2$ has disadvantages in that thermal stability and cycle characteristic are low and material synthesis with a quantitative stoichiometric ratio is difficult. To solve such problems, although there was an attempt to stabilize the structure by adding cobalt to $LiNiO_2$, there was a problem in that an amount of cobalt added to stabilize the structure is 30 mol % or higher, which is large, and causes a relative decrease in capacity.

Due to such circumstances, a material that is currently being spotlighted the most as a positive electrode active material for substituting for $LiCoO_2$ is a lithium-nickel-manganese-cobalt-based oxide, that is, $Li(Ni_xCo_yMn_z)O_2$ (here, x, y, and z are atomic fractions of independent oxide-forming elements, and $0<x\leq1$, $0<y\leq1$, $0<z\leq1$, and $0<x+y+z\leq1$). This material has advantages in that the material is less expensive than $LiCoO_2$ and can be used at high capacity and high voltage but has disadvantages in that a rate capability and lifespan characteristic at high temperature are inferior.

To solve such problems, a method in which a core-shell double layer is fabricated by synthesizing a core material and coating the outside of the core material with a material having a different composition and then a transition metal oxide of which metal compositions of the core and the shell are different is fabricated by mixing the core-shell double layer with a lithium salt and heat-treating the mixture has been proposed. According to this method, although structural stability can be somewhat improved by synthesizing metals of the core and shell layers with varying metal compositions during the synthesis, there are problems in that an effect of improving an output characteristic is not satisfactory and reproducibility is low.

Also, to realize advantages of both a lithium-cobalt-based oxide and a lithium-nickel-manganese-cobalt-based oxide, a method of using a positive electrode active material that includes both the lithium-cobalt-based oxide and the lithium-nickel-manganese-cobalt-based oxide has been proposed. In this case, in comparison to a positive electrode active material that includes only the lithium-nickel-manganese-cobalt-based oxide, an excellent effect could be achieved in terms of electrode density. However, in the case of the lithium-cobalt-based oxide and the lithium-nickel-manganese-cobalt-based oxide, there is a problem in that structural stability is rather deteriorated because of an occurrence of a swelling phenomenon during charging and discharging due to different driving voltages.

DISCLOSURE

Technical Problem

A first technical object of the present invention is to provide a positive electrode active material for a secondary battery that exhibits a high electrode density and is capable of improving an output characteristic of a battery.

A second technical object of the present invention is to provide a positive electrode including the positive electrode active material.

A third technical object of the present invention is to provide a lithium secondary battery, a battery module, and a battery pack including the positive electrode.

Technical Solution

To achieve the above objects, according to an embodiment of the present invention, there is provided a positive electrode active material for a secondary battery, the positive electrode active material including a first lithium-nickel oxide particle having an average particle size ($D_{50}$) of more than 8 μm to 20 μm or less, and a second lithium-nickel oxide particle having an average particle size ($D_{50}$) of 8 μm or less, wherein the first lithium-nickel oxide particle has a particle strength of 100 MPa to 250 MPa, the second lithium-nickel oxide particle has a particle strength of 50 MPa to 100 MPa, a ratio r of the strength of the first lithium-nickel oxide particle to the strength of the second lithium-nickel oxide particle satisfies Equation 1 below, and $$1 < r \leq 3 \quad \text{[Equation 1]}$$

the first and second lithium-nickel oxides independently include nickel at a content of 80 atom % or more with respect to a total atomic weight of metal elements other than lithium present in the oxides.

According to another embodiment of the present invention, there is provided a positive electrode including the positive electrode active material.

Further, according to still another embodiment of the present invention, there are provided a lithium secondary battery, a battery module, and a battery pack including the positive electrode.

Other details of the embodiments of the present invention are included in the detailed description below.

Advantageous Effects

According to the present invention, a positive electrode active material for a secondary battery includes two types of lithium-nickel oxide particles having different particle sizes and particle strengths, thereby considerably improving an electrode density when applied to a positive electrode for a secondary battery and considerably improving a battery characteristic such as an output characteristic when applied to a battery. Accordingly, the positive electrode active material according to the present invention can be useful for a battery such as a battery for a vehicle or a battery for an electric tool that requires a high output characteristic, particularly for the battery for a vehicle.

BEST MODE

Hereinafter, the present invention will be described in more detail to assist understanding of the present invention.

Terms or words used in the present specification and claims are not to be limitedly interpreted as general or dictionary meanings and should be interpreted as meanings and concepts that are consistent with the technical idea of the present invention on the basis of the principle that an inventor may properly define concepts of terms to describe his or her invention in the best way.

Various methods for increasing a density of a positive electrode are being tried to realize a high-capacity and high-output lithium secondary battery. Among the methods, there is a method of increasing a filling density of a positive electrode active material, but when the filling density of the positive electrode active material is increased as in the method, there is a problem in that a contact area between a non-aqueous electrolyte and an active material in a positive electrode active material layer is limited, and thus a rate capability is deteriorated. Also, because the active material layer is highly densely filled with active material particles, it is easy for particle fragmentation to occur during charging and discharging, and as a result, there is a concern that a cycle characteristic may be deteriorated. Regarding such a problem, although a method of mixing and using two types of positive electrode active materials having different particle sizes is used and a capacity density of a positive electrode can be improved in this case, there is a problem in that a volume capacity density, stability, and the cycle characteristic of the electrode are deteriorated.

Generally, a positive electrode is fabricated by compressing a positive electrode active material particle. Here, compressive stress energy is concentrated on an active material particle with low compressive fracture strength, and as a result, the active material particle with low compressive fracture strength is fractured and extremely miniaturized. Also, the extremely miniaturized active material particle is press-fitted and highly densely filled between active material particles with relatively high compressive fracture strength used together, thereby allowing a positive electrode that has high filling performance as a whole and a high volume capacity density to be fabricated.

Accordingly, in the present invention, by using two types of lithium-nickel oxides that include a high content of nickel and have different average particle sizes and particle strengths as positive electrode active materials, a high electrode density can be realized without deterioration of electrochemical characteristics such as a cycle characteristic and a high current discharge characteristic required for a positive electrode, and as a result, an output characteristic of a battery can be improved.

That is, according to an embodiment of the present invention, a positive electrode active material for a secondary battery includes a first lithium-nickel oxide particle having an average particle size ($D_{50}$) of more than 8 μm to 20 μm or less, and a second lithium-nickel oxide particle having an average particle size ($D_{50}$) of 8 μm or less, wherein the first lithium-nickel oxide particle has a particle strength of 100 MPa to 250 MPa, the second lithium-nickel oxide particle has a particle strength of 50 MPa to 100 MPa, a ratio r of the strength of the first lithium-nickel oxide particle to the strength of the second lithium-nickel oxide particle satisfies Equation 1 below, $$1 < r \leq 3 \quad \text{[Equation 1]}$$

and the first and second lithium-nickel oxides independently include nickel at a content of 80 atom % or more with respect to a total atomic weight of metal elements other than lithium present in the oxides.

In the present invention, the strength of each of the first and second lithium-nickel oxide particles is a value of a force when a particle is broken as a pressure of 100 mN is applied to each of the particles for a minute that is measured using a particle strength analyzer and is indicated in MPa, which is a pressure per unit area.

Specifically, in the positive electrode active material according to an embodiment of the present invention, because the first and second lithium-nickel oxide particles include a high content of nickel, specifically, a high content of 80 atom % or more with respect to the total atomic weight of the metal elements other than lithium present in the oxides, a high discharge capacity characteristic can be exhibited.

More specifically, the first and second lithium-nickel oxide particles may independently include a lithium-nickel oxide represented by Formula 1 below:

$$Li_aNi_{1-x-y}Co_xM1_yM2_wO_2 \quad \text{[Formula 1]}$$

In Formula 1, $1.0 \leq a \leq 1.5$, $0 \leq x \leq 0.2$, $0 \leq y \leq 0.2$, $0 \leq w \leq 0.1$ and $0 \leq x+y \leq 0.2$, and more specifically, $1.0 \leq a \leq 1.2$, $0 < x \leq 0.2$, $0 < y \leq 0.2$, $0 < w \leq 0.1$ and $0 < x+y \leq 0.2$, M1 may include any one or both selected from the group consisting of Mn and Al, and M2 may include any one or two or more elements selected from the group consisting of Ba, Ca, Zr, Ti, Mg, Ta, Nb, and Mo.

When the first and second lithium-nickel oxide particles each have a composition represented by Formula 1, a superior capacity characteristic as well as excellent structural stability can be exhibited.

Specifically, in a lithium-nickel oxide expressed by Formula 1 above, Li may be included at a content corresponding to a, that is, $1.0 \leq a \leq 1.5$. When a is less than 1.0, there is a concern that the capacity may be deteriorated, and when a exceeds 1.5, the particle is sintered in a sintering process and thus it may be difficult to fabricate an active material. In consideration of the balance between the remarkableness of the effect of improving a capacity characteristic of a positive electrode active material in accordance with control of Li content and sinterability when fabricating the active material, Li may be included at a content of, more specifically, $1.0 \leq a \leq 1.2$, and even more specifically, $1.0 \leq a \leq 1.15$.

Also, in the lithium-nickel oxide represented by Formula 1, Ni may be included at a content corresponding to 1−x−y, that is, a content of $0.8 \leq 1-x-y \leq 1$. When 1−x−y is less than 0.8, there is a concern that the capacity characteristic may be deteriorated, and when 1−x−y exceeds 1, there is a concern that high-temperature stability may be deteriorated. In consideration of the remarkableness of the effect of improving a capacity characteristic in accordance with including Ni, Ni may be included at a content of, more specifically, $0.8 \leq 1-x-y < 1$, and even more specifically, $0.8 \leq 1-x-y < 0.95$.

Further, in the lithium-nickel oxide represented by Formula 1 above, M1 may be at least one selected from the group consisting of Al and Mn, and more specifically, may be Al or Mn. M1 may be included at a content corresponding to y, that is, a content of $0 \leq y \leq 0.2$. When y exceeds 0.2, there is a concern that an output characteristic and a capacity characteristic of a battery may rather be deteriorated. In consideration of the remarkableness of the effect of improving a battery characteristic in accordance with including the element M1, M1 may be included at a content of, more specifically, $0 < y \leq 0.2$, and even more specifically, $0.05 \leq y \leq 0.2$.

Further, in the lithium-nickel oxide represented by Formula 1, the elements Ni, Co, and M1 may be partially substituted or doped by another element, i.e., M2, to improve a battery characteristic by controlling a distribution of metal elements within the active material. M2 may be any one or two or more elements selected from the group consisting of Ba, Ca, Zr, Ti, Mg, Ta, Nb, and Mo, and more specifically, may be Zr or Ti. The element M2 may be included in an amount corresponding to w within a range not deteriorating characteristics of the positive electrode active material, that is, a content of $0 \leq w \leq 0.1$. M2 may be included at a content of, more specifically, $0 < w \leq 0.1$, and even more specifically, $0 < w \leq 0.02$.

Specifically, in the positive electrode active material according to an embodiment of the present invention, at least one metal element of nickel, cobalt, and M1 may have a concentration gradient in which the concentration of the metal gradually changes throughout the active material particle, and the slope of the concentration gradient of the metal element may exhibit one or more values. Specifically, nickel, cobalt, and M1 included in the positive electrode active material may be distributed from a center of the positive electrode active material particle to a particle surface or within a core and a shell such that an average slope of a concentration profile is positive (+) or negative (−). By having a gradual concentration gradient in this way, because a sharp phase boundary region is not present from the center to the surface, a crystal structure is stabilized, and thermal stability is increased. When the slope of the concentration gradient of a metal is constant, the effect of improving structural stability may be further improved. Also, by varying a concentration of each of the metals within the active material particle by a concentration gradient, characteristics of a corresponding metal can be easily utilized, and the effect of the positive electrode active material improving battery performance can be further improved.

In the present invention, a concentration gradient or a concentration profile of a metal element refers to a graph showing a content of a metal element within a depth from a particle surface to a central portion when the x-axis indicates the depth from the particle surface to the central portion and the y-axis indicates a content of a metal element. For example, a positive average slope of a concentration profile signifies that a relatively larger amount of a corresponding metal element is disposed at a particle central portion section than at a particle surface portion, and a negative average slope thereof signifies that a relatively larger amount of a metal element is disposed at a particle surface side than at the particle central portion section. In the present invention, a concentration gradient and a concentration profile of a metal in the active material may be checked using methods such as x-ray photoelectron spectroscopy (XPS) (also referred to as electron spectroscopy for chemical analysis (ESCA), an electron probe micro analyzer (EPMA) an inductively coupled plasma-atomic emission spectrometer (ICP-AES), or time-of-flight secondary ion mass spectrometry (ToF-SIMS), and specifically, when a profile of a metal element in the active material is checked using the XPS, an atomic ratio of a metal may be measured for each etching time while etching the active material in a direction from a particle surface toward a central portion, and a concentration profile of the metal element may be checked from this.

More specifically, in at least one particle of the first and second lithium-nickel oxide particles, a concentration of nickel may decrease with a gradual concentration gradient in a direction from the center of the active material particle toward a surface of the particle. Here, the slope of the concentration gradient of nickel may be constant from the center of the active material particle to the surface thereof. In this way, when a concentration of nickel remains high at the particle center within the active material particle and has a concentration gradient in which the concentration decreases toward the particle surface, a decrease in capacity can be prevented even while thermal stability is exhibited.

In the positive electrode active material according to an embodiment of the present invention, a concentration of cobalt included in the positive electrode active material may increase with a concentration gradient that gradually changes in the direction from the center of the active material particle toward the surface of the particle or may increase in each of a core and a shell independently with a gradual concentration gradient in the direction from the center of the active material particle to the surface of the particle. Here, the slope of the concentration gradient of cobalt may be constant from the center of the positive electrode active material particle to the surface thereof or within each of the core and the shell. In this way, when the concentration of cobalt remains low at the particle center within the active material particle and includes a concentration gradient in which the concentration increases toward the surface, a decrease in capacity can be prevented even while a use amount of cobalt is decreased.

In the positive electrode active material according to an embodiment of the present invention, a concentration of M1 included in the positive electrode active material may increase with a gradual concentration gradient in the direction from the center of the active material particle toward the surface of the particle or may increase in each of a core and a shell independently with a gradual concentration gradient in the direction from the center of the active material particle to the surface of the particle. Here, the slope of the concentration gradient of M1 may be constant from the center of the positive electrode active material particle to the surface thereof or within each of the core and the shell. In this way, when the concentration of M1 remains low at the particle center within the active material particle and includes a concentration gradient in which the concentration increases toward the particle surface, thermal stability can be improved without a decrease in capacity. More specifically, M1 may be manganese (Mn).

In the positive electrode active material according to an embodiment of the present invention, nickel, cobalt, and M1 may independently exhibit a concentration gradient that gradually changes throughout the active material particle, the concentration of nickel may decrease with a gradual concentration gradient in the direction from the center of the active material particle toward the surface thereof, and the concentrations of cobalt and M1 may independently increase with a gradual concentration gradient in the direction from the center of the active material particle toward the surface thereof. In this way, by including a combined concentration gradient, in which the concentration of nickel decreases and the concentrations of cobalt and M1 increase toward the surface of the positive electrode active material particle, partially or throughout the active material, thermal stability can be exhibited even while a capacity characteristic is maintained.

In the positive electrode active material according to an embodiment of the present invention, when the first or second lithium-nickel oxide is doped or substituted with the element M2, a doping amount at the particle surface side may be larger. Specifically, a difference in concentration of a doping element between an inside of a particle and a surface side thereof may be 10 atom % to 70 atom %. In this way, when the difference in concentration of a doping element included in the lithium-nickel oxide particle is within the above range, structural stability of the particle itself can be further improved, and as a result, a lifespan characteristic can be improved.

In the present invention, "inside" of a particle refers to a region, excluding a surface of the particle, that is present inside the particle and close to the center of the particle. Specifically, the "inside" refers to a region corresponding to a distance ($r_{in}$) from the center of the particle to the surface thereof, that is, a distance of 0% to 70% of a radius of the particle from the center of the particle. Further, according to the present invention, "surface side" of a particle refers to a region, excluding a center of the particle or an inside of the particle, close to a surface thereof, and specifically, refers to a region corresponding to a distance ($r_{sur}$) to the center from a surface of the particle and a surface of the first particle, that is, a distance of 0% to less than 30% of the radius of the particle from the surface of the particle.

In the present invention, a change in content of a doping element at a surface and an inside of a particle may be measured according to a general method and, specifically, a content of a doping element that is present at the surface may be measured using XPS, transmission electron microscopy (TEM), or energy dispersive x-ray spectroscopy (EDS).

In the positive electrode active material according to an embodiment of the present invention, an average particle size ($D_{50}$) of the first lithium-nickel oxide particle may be more than 8 μm to 20 μm or less, and an average particle size ($D_{50}$) of the second lithium-nickel oxide particle may be 8 μm or less. In this way, by using the first and second lithium-nickel oxide particles having optimized average particle sizes, weight capacity density can be improved when fabricating a positive electrode having different average particle sizes.

In the present invention, the average particle sizes ($D_{50}$) of the first and second lithium-nickel oxide particles may be defined as a particle size based on a particle size distribution at 50%. The average particle sizes ($D_{50}$) of the first and second lithium-nickel oxide particles according to an embodiment of the present invention may be measured using, for example, a laser diffraction method. For example, in the method of measuring the average particle size ($D_{50}$) of the first or second lithium-nickel oxide particle, the first or second lithium-nickel oxide particle may be dispersed in a dispersion medium, the dispersed particles may be introduced into a commercially available laser diffraction particle size measurement device (for example, Microtrac MT 3000), and then an ultrasonic wave of about 28 kHz may be radiated with an output of 60 W to calculate the average particle size ($D_{50}$) based on a particle size distribution at 50% in the measurement device.

More specifically, the first lithium-nickel oxide particle and the second lithium-nickel oxide particle may have an average particle size ratio (a ratio of the first lithium-nickel oxide particle to the second lithium-nickel oxide particle) of 1.5 to 3 within each of the above ranges of optimal average particle sizes. In this way, by further controlling the particle size ratio between first and second lithium-nickel oxide particles under a condition that satisfies the above particle size ranges of the first and second lithium-nickel oxide particles, a weight capacity density of a positive electrode can be further improved without a concern about deteriorating a volume capacity density, stability, and a cycle characteristic of the electrode. More specifically, the average particle size ratio between the first and second lithium-nickel oxide particles may be 1.5 to 2.5, and even more specifically, 1.7 to 2.5.

In the positive electrode active material according to an embodiment of the present invention, when the strength is measured, the first lithium-nickel oxide particle may have a particle strength of 100 MPa to 250 MPa, the second lithium-nickel oxide particle may have a particle strength of 50 MPa to 100 MPa, and here, the first lithium-nickel oxide particle has a higher strength than the second lithium-nickel oxide particle. The strength of an oxide particle may be determined by controlling each composition, crystallinity, and the like, and by controlling strength values of the oxide particles used together to be within the above ranges, filling performance in a positive electrode can be improved when fabricating a positive electrode afterwards, and as a result, a volume capacity density of the positive electrode can be improved. More specifically, the first lithium-nickel oxide particle may have a particle strength of 150 MPa to 250 MPa, and the second lithium-nickel oxide particle may have a particle strength of 60 MPa to 80 MPa.

A ratio r of the strength of the first lithium-nickel oxide particle to the strength of the second lithium-nickel oxide particle may satisfy Equation 1 below.

$$1 < r \leq 3$$ [Equation 1]

By including the first and second lithium-nickel oxides that satisfy the above strength ratio range, a high electrode density can be realized without deterioration of electrochemical characteristics such as a cycle characteristic and a high current discharge characteristic required for a positive electrode. More specifically, the positive electrode active material may include the first and second lithium-nickel oxides having the above characteristics such that a value of r in Equation 1 above is 1.5 to 3, and more preferably, 1.5 to 2.

The positive electrode active material according to an embodiment of the present invention may have a tap density of 2.0 g/cc or higher or 2.0 g/cc to 2.5 g/cc, and more particularly, 2.3 g/cc to 2.5 g/cc. By having a high tap density in the above ranges, a high capacity characteristic can be exhibited. In the present invention, the tap density of the positive electrode active material may be measured using a general tap density measuring device, and more specifically, a tap density tester.

The positive electrode active material according to an embodiment of the present invention may be fabricated by mixing the first and second lithium-nickel oxide particles that satisfy the above physical characteristics in the above-mentioned mixing ratio. Here, the mixing process is not particularly limited and may be performed in accordance with a general method.

The first and second lithium-nickel oxide particles may also be fabricated in accordance with a general method of fabricating a lithium-nickel oxide particle, but types and contents of raw materials, an input timing, fabricating conditions, and the like may be properly adjusted during the fabrication to satisfy the above physical conditions.

According to still another embodiment of the present invention, a positive electrode including the above positive electrode active material is provided.

Specifically, the positive electrode includes a positive electrode current collector and a positive electrode active material layer formed on the positive electrode current collector and including the above-described positive electrode active material.

The positive electrode current collector is not particularly limited as long as the positive electrode current collector does not cause a chemical change to a battery and has conductivity, and for example, stainless steel, aluminum, nickel, titanium, calcined carbon, or an aluminum or stainless steel whose surface is treated with carbon, nickel, titanium, silver, or the like may be used as the positive electrode current collector. Generally, the positive electrode current collector may have a thickness of 3 to 500 μm, and an adhesive force of a positive electrode active material may be improved by forming fine irregularities on a surface of the current collector. For example, the positive electrode current collector may be used in various forms such as a film, a sheet, a foil, a net, a porous body, a foam body, and a nonwoven fabric body.

In addition to the above-described positive electrode active material, the positive electrode active material layer may include a conductive material and a binder.

Here, the conductive material is used to impart conductivity to an electrode, and in a constituted battery, any conductive material can be used without particular limitations as long as the conductive material does not cause a chemical change and has electronic conductivity. Specific examples include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; conductive whisker such as zinc oxide and potassium titanate; a conductive metal oxide such as titanium oxide; a conductive polymer such as a polyphenylene derivative, or the like, and any one or a mixture of two or more selected therefrom may be used as the conductive material. Generally, the conductive material may be included at 1 to 30 wt % with respect to a total weight of the positive electrode active material layer.

The binder performs a role of improving adhesion between positive electrode active material particles and an adhesive force between the positive electrode active material and the current collector. Specific examples thereof include polyvinylidene fluoride (PVDF), a PVDF-hexafluoropropylene copolymer (PVDF-co-HFP), polyvinyl alcohol, polyacrylonitrile, carboxymethyl cellulose (CMC), starch, hydroxypropylcellulose, regenerated cellulose, polyvinyl pyrrolidone, tetrafluoroethylene, polyethylene, polypropylene, an ethylene-propylene-diene monomer (EPDM), a sulfonated EPDM, styrene butadiene rubber (SBR), fluororubber, or various copolymers thereof, and one or a mixture of two or more selected therefrom may be used as the binder. The binder may be included at 1 to 30 wt % with respect to the total weight of the positive electrode active material layer.

Except for use of the above-described positive electrode active material, the positive electrode may be fabricated in accordance with a general method of fabricating a positive electrode. Specifically, the positive electrode may be fabricated by applying a composition for forming a positive electrode active material layer that includes the above-described positive electrode active material and selectively includes the binder and the conductive material on the positive electrode current collector and then drying and rolling. Here, the types and contents of the positive electrode active material, the binder, and the conductive material are the same as those described above.

A solvent may be a solvent that is generally used in the art, examples of the solvent may include dimethyl sulfoxide (DMSO), isopropyl alcohol, N-methyl pyrrolidone (NMP), acetone, or water, and one or a mixture of two or more selected therefrom may be used as the solvent. A use amount of the solvent is sufficient as long as the solvent has a viscosity capable of allowing the positive electrode active material, the conductive material, and the binder to be dissolved or dispersed and exhibiting excellent thickness uniformity when applied layer for fabricating a positive electrode in consideration of a thickness of an applied slurry and a fabrication yield.

With another method, the positive electrode may be fabricated by casting the composition for forming the positive electrode active material layer on a separate support body and then laminating a film obtained by separation from the support body on the positive electrode current collector.

According to still another embodiment of the present invention, an electrochemical device including the positive electrode is provided. Specifically, the electrochemical device may be a battery, a capacitor, and the like, and more specifically, may be a lithium secondary battery.

Specifically, the lithium secondary battery includes a positive electrode, a negative electrode disposed opposite the positive electrode, a separator interposed between the positive electrode and the negative electrode, and an electrolyte, and the positive electrode is the same as that described above. Also, the lithium secondary battery may selectively further include a battery container configured to store an electrode assembly including the positive electrode, the negative electrode, and the separator, and a sealing member configured to seal the battery container.

In the lithium secondary battery, the negative electrode includes a negative electrode current collector and a negative electrode active material layer disposed on the negative electrode current collector.

The negative electrode current collector is not particularly limited as long as the negative electrode current collector does not cause a chemical change to a battery and has high conductivity, and for example, copper, stainless steel, aluminum, nickel, titanium, calcined carbon, or a copper or stainless steel whose surface is treated with carbon, nickel, titanium, silver, and the like, an aluminum-cadmium alloy etc. may be used as the negative electrode current collector. Generally, the negative electrode current collector may have a thickness of 3 μm to 500 μm, and, like the positive electrode current collector, an adhesive force of a negative electrode active material may be improved by forming fine irregularities on a surface of the current collector. For example, the negative electrode current collector may be used in various forms such as a film, a sheet, a foil, a net, a porous body, a foam body, and a nonwoven fabric body.

In addition to the above-described negative electrode active material, the negative electrode active material layer may selectively include a conductive material and a binder. As an example, the negative electrode active material layer may be fabricated by applying a composition for forming a negative electrode that includes the negative electrode active material and selectively includes the binder and the conductive material on the negative electrode current collector and then drying, or by casting the composition for forming the negative electrode on a separate support body and then laminating a film obtained by separation from the support body on the negative electrode current collector.

A compound capable of reversible intercalation and deintercalation of lithium may be used as the negative electrode active material. Specific examples include a carbonaceous material such as artificial graphite, natural graphite, graphitized carbon fiber, and amorphous carbon; a metallic compound capable of being formed into an alloy with lithium, such as Si, Al, Sn, Pb, Zn, Bi, In, Mg, Ga, Cd, an Si-alloy, an Sn-alloy, and an Al-alloy; a metal oxide capable of doping and dedoping lithium, such as SiOx (0<x<2), SnO2, vanadium oxide, and lithium vanadium oxide; or a composite including the metallic compound and the carbonaceous material, such as an Si—C compound or an Sn—C compound, and one or a mixture of two or more selected therefrom may be used as the negative electrode active material. Also, a metal lithium thin film may be used as the negative electrode active material. Both low crystalline carbon and high crystalline carbon may be used as the carbon material. Soft carbon and hard carbon are typical low crystalline carbon, and high-temperature calcined carbons such as amorphous, plate-shaped, flake-shaped, spherical, or fiber type natural graphite or artificial graphite, Kish graphite, pyrolytic carbon, mesophase pitch based carbon fiber, meso-carbon microbeads, mesophase pitches, and petroleum or coal tar pitch derived cokes are typical high crystalline carbon.

Also, the binder and the conductive material may be the same as those described above with respect to the positive electrode.

In the lithium secondary battery, the separator separates the negative electrode and the positive electrode and provides a movement path for lithium ions, and anything that is generally used as a separator in a lithium secondary battery may be used without particular limitation. Particularly, it is preferable that the separator have low resistance with respect to ion movement in an electrolyte and have excellent ability of impregnating an electrolyte. Specifically, a porous polymer film, for example, a porous polymer film fabricated with a polyolefin-based polymer such as an ethylene homopolymer, a propylene homopolymer, an ethylene-butene copolymer, an ethylene-hexene copolymer, and an ethylene-methacrylate copolymer or a stacked structure of two or more layers thereof may be used. Also, a general porous nonwoven fabric, for example, a nonwoven fabric formed of high-melting-point glass fiber, polyethylene terephthalate fiber, or the like may be used. A coated separator including a ceramic component or a polymer material for securing heat resistance or mechanical strength may be used, and may be used in a single-layer or multi-layer structure.

Examples of an electrolyte used in the present invention may include an organic liquid electrolyte, an inorganic liquid electrolyte, a solid polymer electrolyte, a gel-type polymer electrolyte, an inorganic solid electrolyte, and a molten-type inorganic electrolyte, which can be used in the manufacture of a lithium secondary battery, but the present invention is not limited thereto.

Specifically, the electrolyte may include an organic solvent and a lithium salt.

Anything that can serve as a medium capable of moving ions that are involved in an electrochemical reaction of a battery can be used as the organic solvent without particular limitation. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethylcarbonate (DMC), diethylcarbonate (DEC), methylethylcarbonate (MEC), ethylmethylcarbonate (EMC), ethylene carbonate (EC), and propylene carbonate (PC); an alcohol-based solvent such as ethyl alcohol and isopropyl alcohol; nitriles such as R—CN (R is a linear, branched, or cyclic hydrocarbon group of C2 to C20, and may include a double bond aromatic ring or an ether bond); amides such as dimethylformamide; dioxolanes such as 1.3-dioxolane; or sulfolane may be used as the organic solvent. Among these, the carbonate-based solvent is preferable, and a mixture of a cyclic carbonate (for example, EC or PC) having high ion conductivity and a high dielectric constant capable of improving the charge/discharge performance of a battery and a linear carbonate-based compound (for example, EMC, DMC, or DEC) having a low viscosity is more preferable. In this case, excellent performance of an electrolyte may be exhibited when the cyclic carbonate and the chain carbonate are mixed in a volume ratio of about 1:1 to 1:9 and used.

Any compound capable of providing lithium ions used in a lithium secondary battery may be used as the lithium salt without particular limitation. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used as the lithium salt. The concentration of the lithium salt is preferably in the range of 0.1 to 2.0 M. When the concentration of the lithium salt is within the above range, because the electrolyte has an appropriate conductivity and viscosity, the electrolyte can exhibit excellent electrolyte performance, and the lithium ions can effectively move.

For purposes of improving a lifespan characteristic of a battery, suppressing a decrease in battery capacity, improving a discharge capacity of a battery, and the like, for example, the electrolyte may further include one or more additives such as haloalkylene carbonate-based compound such as difluoroethylene carbonate or the like, pyridine, triethyl phosphite, triethanolamine, cyclic ether, ethylenediamine, n-glyme, hexaphosphate triamide, a nitrobenzene derivative, sulfur, quinone imine dyes, N-substituted oxazolidinone, N,N-substituted imidazolidine, ethylene glycol dialkyl ether, ammonium salt, pyrrole, 2-methoxyethanol, aluminum trichloride, or the like in addition to the components of the electrolyte. Here, the additive may be included at 0.1 to 5 wt % with respect to the total weight of the electrolyte.

Because the lithium secondary battery including the positive electrode active material according to the present invention stably exhibits an excellent discharge capacity, output characteristic, and capacity retention as described above, the lithium secondary battery is useful for portable devices such as a mobile phone, a laptop computer, and a digital camera and in the electric vehicle field including a hybrid electric vehicle (HEV).

Accordingly, according to another implementation of the present invention, a battery module including the lithium secondary battery as a unit cell and a battery pack including the same are provided.

The battery module or battery pack may be used as a power source of a medium to large sized device of one or more of a power tool; an electric car including an electric vehicle (EV), a hybrid electric vehicle, and a plug-in hybrid electric vehicle (PHEV); or a power storage system.

Mode

Hereinafter, an embodiment of the present invention will be described in detail so that one of ordinary skill in the art to which the present invention pertains can easily practice the present invention. However, the present invention may be implemented in various other forms and is not limited to the embodiment described herein.

Examples and Comparative Examples: Fabrication of Positive Electrode Active Material The first and second lithium-nickel oxide particles described in Table 1 below were mixed in a weight ratio of 8:2 to fabricate respective positive electrode active materials.

TABLE 1

| Type | First lithium-nickel oxide particle | | | Second lithium-nickel oxide particle | | | Value of r | Tap density |
|---|---|---|---|---|---|---|---|---|
| | Composition | Average particle size ($D_{50}$) | Particle strength | Composition | Average particle size ($D_{50}$) | Particle strength | | |
| Example 1 | $LiNi_{0.8}Co_{0.1}Mn_{0.1}O_2$ | 15 μm | 200 MPa | $LiNi_{0.8}Co_{0.1}Mn_{0.1}O_2$ | 8 μm | 70 MPa | 2.86 | 2.35 g/cc |
| Example 2 | $LiNi_{0.8}Co_{0.1}Mn_{0.1}O_2$ | 13 μm | 180 MPa | $LiNi_{0.8}Co_{0.1}Mn_{0.1}O_2$ | 6 μm | 60 MPa | 3.00 | 2.35 g/cc |
| Example 3 | $LiNi_{0.8}Co_{0.1}Mn_{0.1}Zr_{0.02}O_2$ | 12 μm | 150 MPa | $LiNi_{0.8}Co_{0.1}Mn_{0.1}Zr_{0.02}O_2$ | 7 μm | 67 MPa | 2.24 | 2.32 g/cc |
| Example 4 | $LiNi_{0.9}Co_{0.1}Mn_{0.1}O_2$ (concentration gradient) | 18 μm | 250 MPa | $LiNi_{0.9}Co_{0.1}Mn_{0.1}O_2$ (concentration gradient) | 7 μm | 120 MPa | 2.08 | 2.30 g/cc |
| Comparative Example 1 | $LiNi_{0.8}Co_{0.1}Mn_{0.1}O_2$ | 15 μm | 130 MPa | $LiNi_{0.8}Co_{0.1}Mn_{0.1}O_2$ | 6 μm | 130 MPa | 1.00 | 2.35 g/cc |
| Comparative Example 2 | $LiNi_{0.8}Co_{0.1}Mn_{0.1}O_2$ | 18 μm | 240 MPa | $LiNi_{0.8}Co_{0.1}Mn_{0.1}O_2$ | 6 μm | 70 MPa | 3.43 | 2.45 g/cc |
| Comparative Example 3 | $LiNi_{0.8}Co_{0.1}Mn_{0.1}O_2$ | 8 μm | 70 MPa | $LiNi_{0.8}Co_{0.1}Mn_{0.1}O_2$ | 6 μm | 70 MPa | 1.00 | 2.35 g/cc |
| Comparative Example 4 | $LiNi_{0.8}Co_{0.1}Mn_{0.1}O_2$ | 15 μm | 200 MPa | $LiNi_{0.8}Co_{0.1}Mn_{0.1}O_2$ | 12 μm | 150 MPa | 1.33 | 2.35 g/cc |
| Comparative Example 5 | $LiNi_{0.8}Co_{0.1}Mn_{0.1}O_2$ | 15 μm | 90 MPa | $LiNi_{0.8}Co_{0.1}Mn_{0.1}O_2$ | 10 μm | 90 MPa | 1.00 | 2.25 g/cc |

* The value of r is rounded off to the second decimal place

In Table 1, r=a ratio of the strength of the first lithium-nickel oxide particle/the strength of the second lithium-nickel oxide particle, and here, a force when a particle is broken as a pressure of 100 mN is applied to each of the particles for a minute was measured using a particle strength analyzer (unit: MPa).

In Table 1, the first and second lithium-nickel oxide particles of Example 4 were fabricated using a method below so that nickel, cobalt, and manganese in the particles are distributed with a concentration gradient.

Specifically, in a batch-type 5 L reactor set at 60° C., nickel sulfate, cobalt sulfate, and manganese sulfate were mixed in a molar ratio of 90:5:5 in water to prepare a first metal-containing solution at a concentration of 2 M, and nickel sulfate, cobalt sulfate, and manganese sulfate were mixed in a molar ratio of 80:10:10 in water to prepare a second metal-containing solution at a concentration of 2 M. A vessel containing the first metal-containing solution was connected to enter the reactor, and a vessel containing the second metal-containing solution was connected to enter the first metal-containing solution vessel. In addition, a 4M NaOH solution and a NH₄OH aqueous solution at a concentration of 7% were prepared and connected to the rector, respectively. 3 L of deionized water was added to a coprecipitation reactor (capacity: 5 L), the reactor was purged with nitrogen gas at a rate of 2 L/min to remove oxygen dissolved in water, and a non-oxidizing atmosphere was formed in the reactor. Then, 100 ml of 4M NaOH was added thereto, and the mixture was maintained at pH 11 at a stirring speed of 1,200 rpm at 60° C. Then, the first metal-containing solution, the NaOH aqueous solution, and the NH₄OH aqueous solution were added at 180 ml/hr, 180 ml/hr, and 10 ml/hr, respectively and reacted for 30 minutes, and then the second metal-containing solution was added to the vessel containing the first metal-containing solution at 150 ml/hr to simultaneously induce the growth of hydroxide particles and induce a concentration gradient to be formed inside the particles. Then, the reactions were maintained at the times shown in Table 2 below to grow a nickel-manganese-cobalt-based composite metal hydroxide. A precursor particle formed as a result was mixed with lithium hydroxide as a lithium source material in a molar ratio of 1:1 (molar ratio of Me/Li, Me is a total molar amount of a metal element in the precursor) and then heat-treated for 10 hours at 750° C. under an oxygen atmosphere (oxygen partial pressure 20%) to fabricate lithium-nickel oxide particles having a concentration gradient.

TABLE 2

| Type | Reaction maintenance time |
|---|---|
| First lithium-nickel oxide particle of Example 4 | 32 hours |
| Second lithium-nickel oxide particle of Example 4 | 18 hours |

Fabrication Example: Fabrication of Lithium Secondary Battery

A lithium secondary battery was fabricated using each of the positive electrode active materials fabricated in Example 1 to Example 4 and Comparative Example 1 to Comparative Example 5.

Specifically, each of the positive electrode active materials fabricated in Example 1 to Example 4 and Comparative Example 1 to Comparative Example 5, carbon black as a conductive material, and PVDF as a binder were mixed in a weight ratio of 90:5:5 in an N-methyl pyrrolidone (NMP) solvent to fabricate a composition for forming a positive electrode (viscosity: 5,000 mPa·s), and the composition was applied on an aluminum current collector and then dried and rolled, thereby fabricating a positive electrode.

Also, a mesocarbon microbead (MCMB), which is artificial graphite, as a negative electrode active material, carbon black as a conductive material, and PVDF as a binder were mixed in a weight ratio of 85:10:5 in an NMP solvent to fabricate a composition for forming a negative electrode, and the composition was applied on a copper current collector, thereby fabricating a negative electrode.

A porous polyethylene separator was interposed between the positive electrode and the negative electrode fabricated as above to fabricate an electrode assembly, the electrode assembly was placed inside a case, and then an electrolyte was injected into the case to fabricate a lithium secondary battery. Here, the electrolyte was fabricated by dissolving lithium hexafluorophosphate (LiPF$_6$) at a concentration of 1.15M in an organic solvent consisting of EC/DMC/EMC in a mixture volume ratio of 3:4:3.

Experimental Example 1: Evaluation of Electrode Density

A force of 4,000 kg·f was applied using a roller to each of the positive electrodes fabricated according to the above fabrication example using the positive electrode active materials fabricated in Example 1, Example 2, and Comparative Example 1 to Comparative Example 5 to measure a thickness after rolling and a weight of the electrode, and a threshold electrode density was evaluated from this. The result thereof is shown in Table 3 below.

TABLE 3

| | First lithium-nickel oxide particle | | | Second lithium-nickel oxide particle | | | | |
|---|---|---|---|---|---|---|---|---|
| Type | Composition | Average particle size (D$_{50}$) | Particle strength | Composition | Average particle size (D$_{50}$) | Particle strength | Value of r | Threshold electrode density |
| Example 1 | LiNi$_{0.8}$Co$_{0.1}$Mn$_{0.1}$O$_2$ | 15 μm | 200 MPa | LiNi$_{0.8}$Co$_{0.1}$Mn$_{0.1}$O$_2$ | 8 μm | 70 MPa | 2.86 | 3.6 g/cc |
| Example 2 | LiNi$_{0.8}$Co$_{0.1}$Mn$_{0.1}$O$_2$ | 13 μm | 180 MPa | LiNi$_{0.8}$Co$_{0.1}$Mn$_{0.1}$O$_2$ | 6 μm | 60 MPa | 3.00 | 3.6 g/cc |
| Comparative Example 1 | LiNi$_{0.8}$Co$_{0.1}$Mn$_{0.1}$O$_2$ | 15 μm | 130 MPa | LiNi$_{0.8}$Co$_{0.1}$Mn$_{0.1}$O$_2$ | 6 μm | 130 MPa | 1.00 | 3.2 g/cc |
| Comparative Example 2 | LiNi$_{0.8}$Co$_{0.1}$Mn$_{0.1}$O$_2$ | 18 μm | 240 MPa | LiNi$_{0.8}$Co$_{0.1}$Mn$_{0.1}$O$_2$ | 6 μm | 70 MPa | 3.43 | 3.3 g/cc |
| Comparative Example 3 | LiNi$_{0.8}$Co$_{0.1}$Mn$_{0.1}$O$_2$ | 8 μm | 70 MPa | LiNi$_{0.8}$Co$_{0.1}$Mn$_{0.1}$O$_2$ | 6 μm | 70 MPa | 1.00 | 3.1 g/cc |
| Comparative Example 4 | LiNi$_{0.8}$Co$_{0.1}$Mn$_{0.1}$O$_2$ | 15 μm | 200 MPa | LiNi$_{0.8}$Co$_{0.1}$Mn$_{0.1}$O$_2$ | 12 μm | 150 MPa | 1.33 | 3.0 g/cc |
| Comparative Example 5 | LiNi$_{0.8}$Co$_{0.1}$Mn$_{0.1}$O$_2$ | 15 μm | 90 MPa | LiNi$_{0.8}$Co$_{0.1}$Mn$_{0.1}$O$_2$ | 10 μm | 90 MPa | 1.00 | 3.0 g/cc |

Experimental Example 2: Evaluation of Battery Characteristic

Charge/discharge was performed under a condition of 0.5° C./0.5° C. within a driving voltage range of 2.8V to 4.25V at room temperature (25° C.) with respect to each of the lithium secondary batteries fabricated according to the fabrication example using the positive electrode active materials fabricated in Example 1 and Comparative Example 1, each of the lithium secondary batteries were charged on the basis of a SOC of 50%, and resistance was measured. Initial resistance in Example 1 at the SOC of 50% was set as 100% and compared with Comparative Example 1. The result thereof is shown in Table 4 below.

TABLE 4

| Type | SOC 50% initial resistance ratio (%) |
|---|---|
| Example 1 | 100 |
| Comparative Example 1 | 106 |

As a result of the experiment, the lithium secondary battery including the positive electrode active material of Comparative Example 1 exhibited higher initial resistance compared to Example 1. From this, the lithium secondary battery including the positive electrode active material according to the present invention was confirmed as having a superior output characteristic.

The invention claimed is:

1. A positive electrode active material for a secondary battery, the positive electrode active material comprising:
a first lithium-nickel oxide particle having an average particle size ($D_{50}$) of more than 8 μm to less than 20 μm; and
a second lithium-nickel oxide particle having an average particle size ($D_{50}$) of 8 μm or less, wherein a ratio of the average particle size ($D_{50}$) of the first lithium-nickel oxide particle to the average particle size ($D_{50}$) of the second lithium-nickel oxide particle (the average particle size of the first lithium-nickel oxide particle/the average particle size of the second lithium-nickel oxide particle) is 1.5 to 3, wherein:
the first lithium-nickel oxide particle has a particle strength of 100 MPa to 250 MPa, and the second lithium-nickel oxide particle has a particle strength of 50 MPa to 100 MPa;
a ratio r of the strength of the first lithium-nickel oxide particle to the strength of the second lithium-nickel oxide particle satisfies Equation 1 below, $$1.5 \leq r \leq 3$$ [Equation 1]

and the first and second lithium-nickel oxides independently include nickel at a content of 80 atom % or more with respect to a total atomic weight of metal elements other than lithium present in the oxides.

2. The positive electrode active material of claim 1, wherein the first and second lithium-nickel oxide particles independently include a compound represented by Formula 1 below, $$Li_aNi_{1-x-y}Co_xM1_yM2_wO_2$$ [Formula 1]

in Formula 1, 1.0≤a≤1.5, 0≤x≤0.2, 0≤y≤0.2, 0≤w≤0.1 and 0≤x+y≤0.2, M1 includes any one or both selected from the group consisting of Mn and Al, and M2 includes any one or two or more elements selected from the group consisting of Ba, Ca, Zr, Ti, Mg, Ta, Nb, and Mo.

3. The positive electrode active material of claim 2, wherein, in Formula 1, 1.0≤a≤1.2, 0<x≤0.2, 0<y≤0.2, 0<w≤0.1 and 0<x+y≤0.2.

4. The positive electrode active material of claim 1, wherein nickel is distributed with a concentration gradient that gradually decreases from a particle center toward a particle surface in at least one particle of the first and second lithium-nickel oxide particles.

5. The positive electrode active material of claim 1, wherein a tap density of the positive electrode active material is 2.0 g/cc or higher.

6. A positive electrode for a secondary battery, the positive electrode comprising the positive electrode active material of claim 1.

7. The positive electrode of claim 6, wherein:
the positive electrode includes a positive electrode current collector and a positive electrode active material layer disposed on the positive electrode current collector; and
the positive electrode active material layer includes the positive electrode active material at 90 to 98 wt % with respect to a total weight of the positive electrode active material layer.

8. The positive electrode of claim 6, wherein the positive electrode has an electrode density of 3.5 g/cc or higher.

9. A lithium secondary battery comprising the positive electrode of claim 6.

* * * * *